United States Patent
Arslan et al.

(10) Patent No.: US 12,392,363 B2
(45) Date of Patent: Aug. 19, 2025

(54) ACTUATORS FOR SOFT ROBOTIC APPLICATIONS

(71) Applicants: ISTANBUL TEKNIK UNIVERSITESI, Istanbul (TR); MARMARA UNIVERSITESI, Istanbul (IT)

(72) Inventors: Ayse Feyza Arslan, Istanbul (TR); Kadir Ozlem, Bursa (TR); Fidan Khalilbayli, Istanbul (TR); Hend Elmoughni, Istanbul (TR); Asli Tuncay Atalay, Istanbul (TR); Gokhan Ince, Istanbul (TR); Ozgur Atalay, Istanbul (TR)

(73) Assignees: ISTANBUL TEKNIK UNIVERSITESI, Istanbul (TR); MARMARA UNIVERSITESI, Istanbul (TR)

( * ) Notice: Subject to any disclaimer, the term of this patent is extended or adjusted under 35 U.S.C. 154(b) by 0 days.

(21) Appl. No.: 18/557,602

(22) PCT Filed: Apr. 27, 2022

(86) PCT No.: PCT/TR2022/050384
§ 371 (c)(1),
(2) Date: Oct. 27, 2023

(87) PCT Pub. No.: WO2022/231556
PCT Pub. Date: Nov. 3, 2022

(65) Prior Publication Data
US 2024/0209876 A1 Jun. 27, 2024

(30) Foreign Application Priority Data
Apr. 29, 2021 (TR) ................ 2021/007340

(51) Int. Cl.
*F15B 15/10* (2006.01)
*B25J 9/14* (2006.01)

(52) U.S. Cl.
CPC ............... *F15B 15/10* (2013.01); *B25J 9/142* (2013.01)

(58) Field of Classification Search
CPC .......... B25J 9/142; F15B 15/10; F15B 15/103
See application file for complete search history.

(56) References Cited

U.S. PATENT DOCUMENTS 4,784,042 A 11/1988 Hardin
6,178,872 B1 1/2001 Schulz
(Continued)

FOREIGN PATENT DOCUMENTS

CN 109909990 A 6/2019
WO 2015066143 A1 5/2015
(Continued)

*Primary Examiner* — Nathaniel E Wiehe
*Assistant Examiner* — Daniel S Collins
(74) *Attorney, Agent, or Firm* — Bayramoglu Law Offices LLC

(57) ABSTRACT

Soft actuators controlled by fluid pressure comprise two sacs which provide for the flexion of a structure upon pressurizing this structure that has an anisotropic flexibility, which is provided by different knitted layers. The knitted layers are produced as integrated with each other by means of the three-dimensional whole-garment knitting technique. The actuators can be adapted according to the different requirements and produced with standard qualities.

1 Claim, 6 Drawing Sheets

(56) References Cited

U.S. PATENT DOCUMENTS

| | | | |
|---|---|---|---|
| 6,718,766 B2 | 4/2004 | Seto et al. | |
| 2002/0157388 A1 | 10/2002 | Seto | |
| 2016/0250758 A1 | 9/2016 | Shepherd et al. | |
| 2019/0015233 A1* | 1/2019 | Galloway | B25J 15/12 |

FOREIGN PATENT DOCUMENTS

| | | |
|---|---|---|
| WO | 2017120314 A1 | 7/2017 |
| WO | 2018136004 A1 | 7/2018 |

* cited by examiner

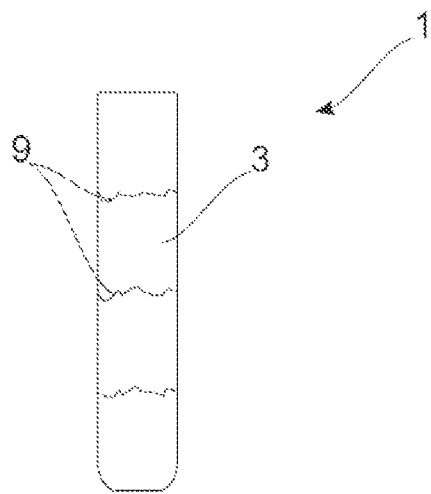
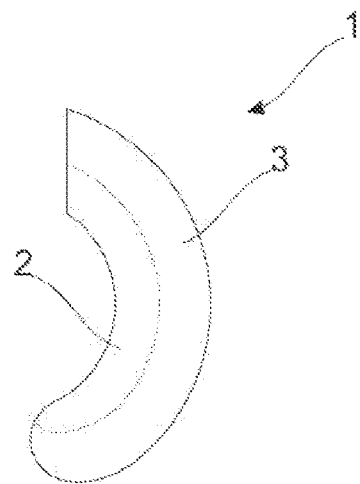
FIG. 5  FIG. 6
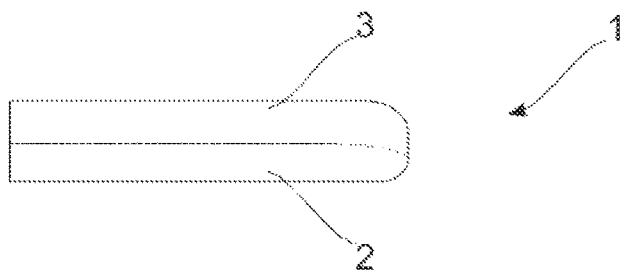
FIG. 7
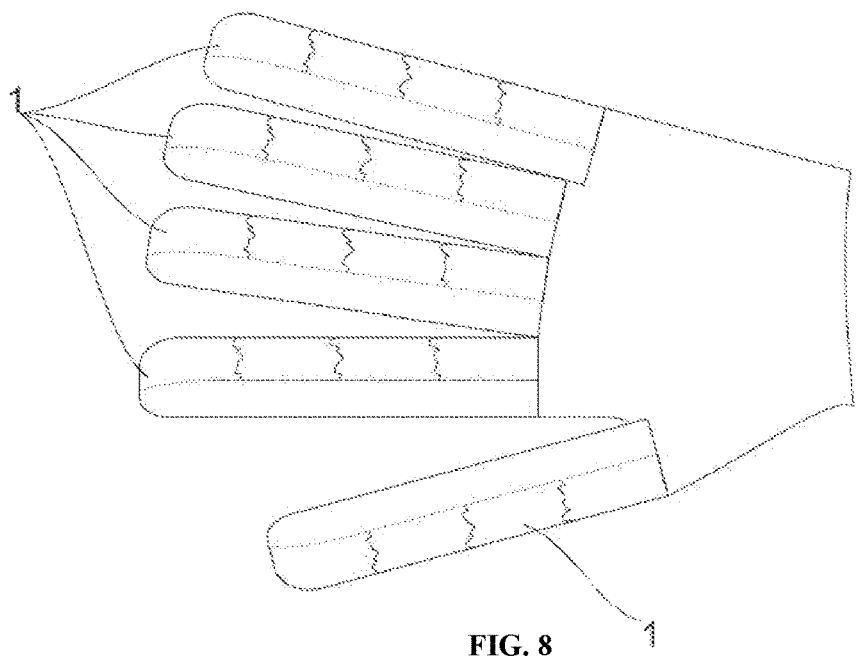
FIG. 8

ACTUATORS FOR SOFT ROBOTIC APPLICATIONS

CROSS REFERENCE TO THE RELATED APPLICATIONS

This application is the national phase entry of International Application No. PCT/TR2022/050384, filed on Apr. 27, 2022, which is based upon and claims priority to Turkish Patent Application No. 2021/007340, filed on Apr. 29, 2021, the entire contents of which are incorporated herein by reference.

TECHNICAL FIELD

The invention is related to soft actuators controlled by fluid pressure.

BACKGROUND

For the production of fluid controlled soft actuators, generally, elastomeric materials such as silicone and rubber are used and by applying pneumatic pressure on these structures, the desired movement is obtained. The desired movement is obtained by the elastomers being molded and added anisotropic attributes. Although elastomeric materials offer certain superior features such as thermal resistance, chemical resistance and conformity to different movements, the attributes—material density, hardness, endurance—of the elastomeric materials can cause difficulties in wearable applications (for example, the hardness and weight of the materials hinder the movement range of the user) or when the design is required to be scaled to size; limit the design options. In order to eliminate these disadvantages, some textile-based soft actuators have been developed. As in many textile products, these are combined and produced by sewing and attaching the cut pieces. Therefore, there are difficulties in achieving the quality objectives depending on high labor costs and a great number of production steps in the production of textile-based soft actuators.

Several solutions for developing the movement possibilities and production methods of soft actuators are known in the present art.

In the document number WO2017120314A1, actuators comprising a sac positioned between two fabric layers have been described. It was indicated that both fabric layers can have anisotropic and isotropic strain properties.

In the document number WO2015066143A1, actuators comprised of a receptacle on which there are support structures have been described. The twisting, straining, torsion behavior of the actuator or a combination thereof is determined by the support structures. Applications making use of more than one receptacle in order to ensure that certain shape variations can be chosen for actuators suitable for more than one action.

In the document number CN109909990A, modules corresponding to certain shape variations and actuators comprised of combination of different modules have been described.

In the document number WO2018136004A1, actuators each of which comprising a limiting element that has an inner sac and a twister element have been described. The twister element has an undulated structure. Use of the limiting element for straightening the actuator has been discussed as well.

In the document number U.S. Pat. No. 6,718,766B2, actuators comprising more than one receptacle positioned in parallel to each other have been described. The pressure of these receptacles is provided by means of the fluid transfer between the same and the twisting of the actuator is ensured.

In the document number U.S. Pat. No. 10,882,195B2, the production of an elastomeric actuator embedded with a fiber within a mold has been described.

SUMMARY

The purpose of the invention is to develop a soft actuator controlled by fluid pressure.

Another purpose of the invention is to develop soft actuators controlled by fluid pressure having high pressure resistance.

Yet another purpose of the invention is to develop a production method that provides for the production of actuators adapted according to different requirements.

BRIEF DESCRIPTION OF THE DRAWINGS

Soft actuators realized in order to achieve the purposes of the invention have been shown in the attached figures.

FIG. 5 is a top view of an actuator according to the invention.

FIG. 6 is a side view of an actuator according to the invention in a twisted state.

FIG. 7 is a side view of an actuator according to the invention in an elongated state.

FIG. 8 is a view of a glove comprising actuators according to the invention.

Figure 1:
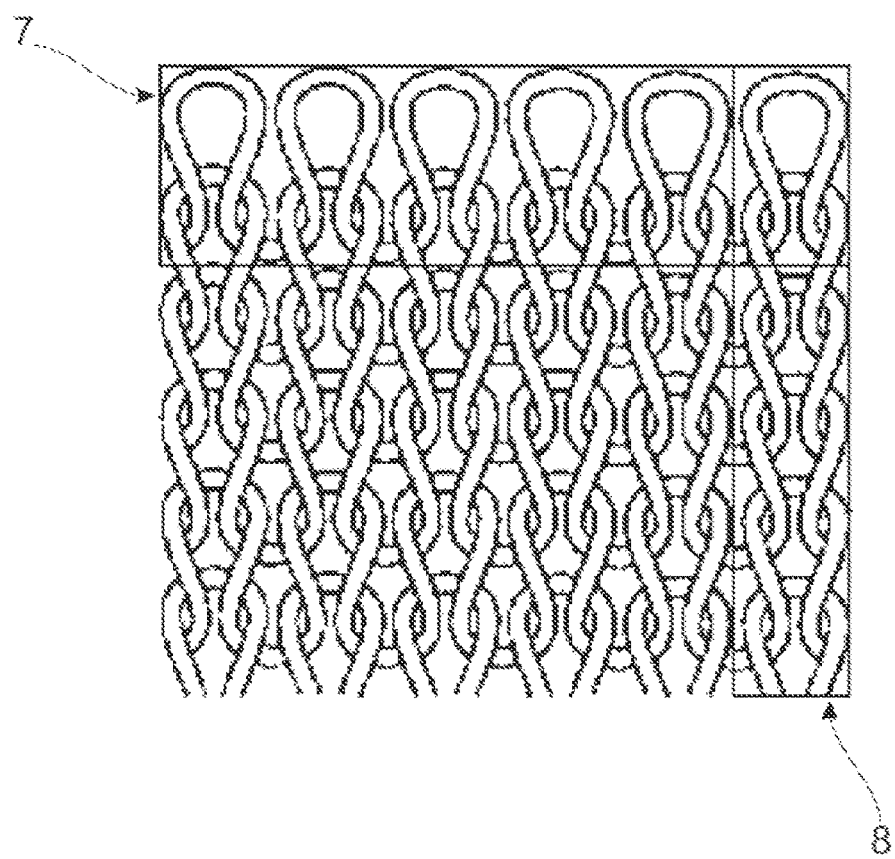
FIG. 1 is a schematic view of a loop structure of the knitted fabric used in an actuator according to the invention.
Figure 2:
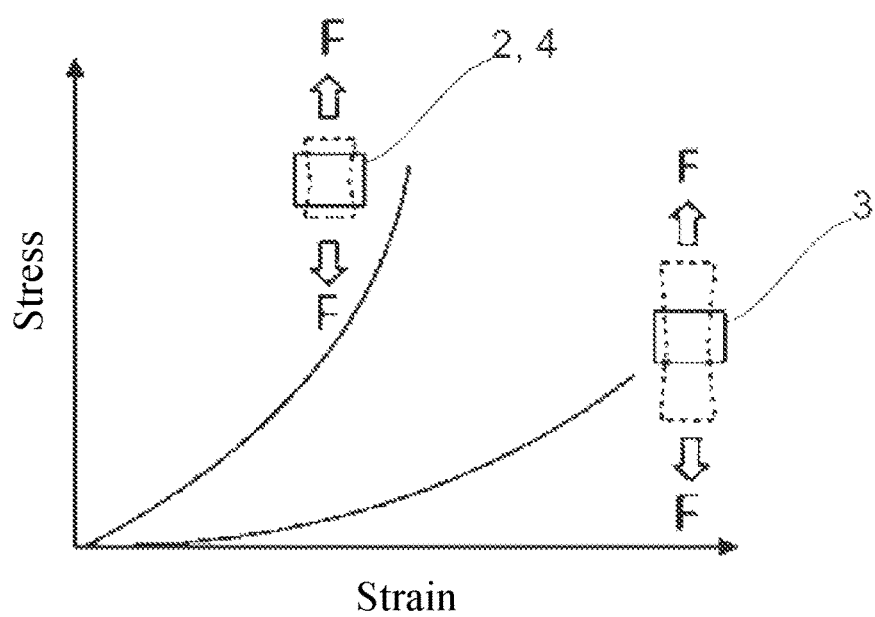
FIG. 2 is a stress-strain curve of the layers used in an actuator according to the invention.
Figure 3:
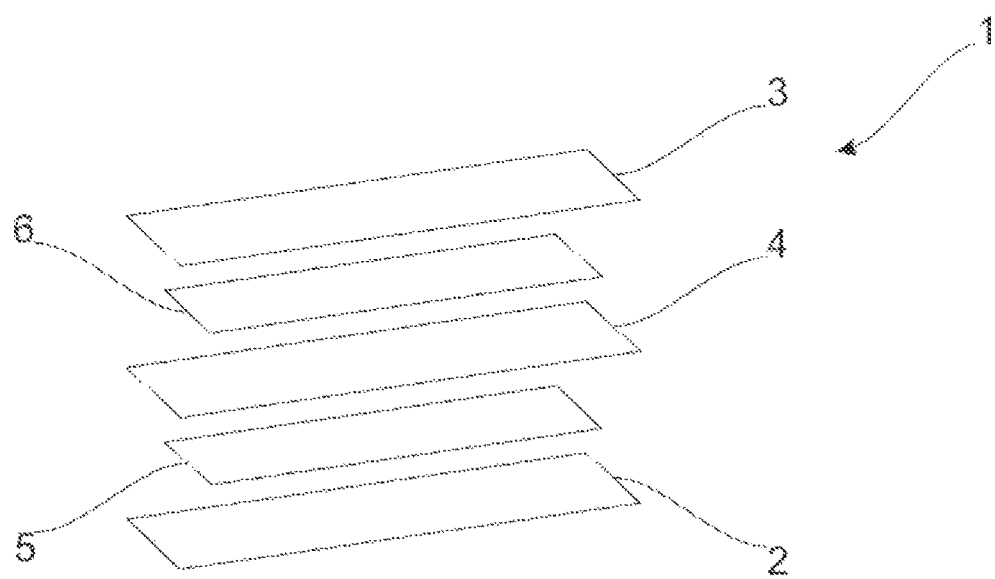
FIG. 3 is a schematic exploded view of an actuator according to the invention.
Figure 4:
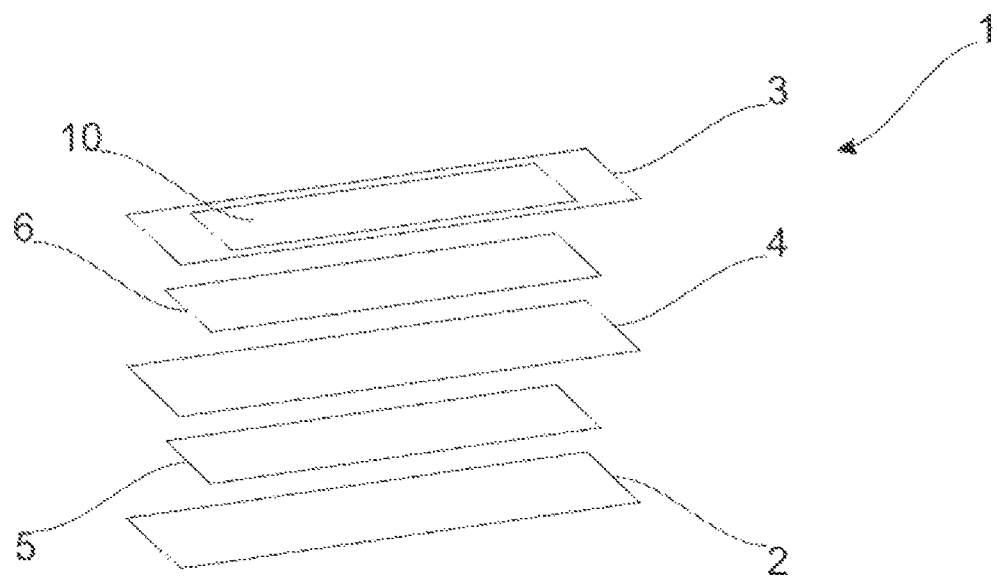
FIG. 4 is a schematic exploded view of a sensor-integrated actuator according to the invention.

The parts in the figures have been individually numbered and their corresponding have been given below.
1. Actuator
2. First layer
3. Second layer
4. Third layer
5. First sac
6. Second sac
7. Course
8. Wale
9. Gather
10. Sensor
11. Glove

DETAILED DESCRIPTION OF THE EMBODIMENTS

Broadly, the soft actuator (1) of the invention which can be moved by means of fluid pressure between a first state in which it extends along a direction and a second position in which it is twisted away from this direction along at least a portion thereof, basically comprises;

a first layer (2), a second layer (3) whose flexibility is greater than the flexibility of the first layer (2), a third layer (4) between the first layer (2) and the second layer (3), having equal flexibility with the first layer (2), a first sac (5) located between the first layer and the third layer, a second sac (6) located between the second layer and the third layer, pressurizing elements that provide the regulation of the pressures of the first sac (5) and the second sac (6).

The first sac (5) and the second sac (6) are produced of leakproof and flexible materials. In a preferred application of the invention, the actuator (1) is pressurized with air and the sacs have airtight quality. For example, the sacs can be manufactured from thermoplastic polyurethane.

With the pressurizing of only the second sac (6) by the pressurizing elements, the third layer (3) is elongated, however, since the first layer (2) and the third layer (4) are not elongated to the same extent, the actuator (1) is twisted towards the first layer (2). By increasing the pressure of the second sac (6), the rigidity of the actuator (1) in a twisted state can be increased.

In the case that only the first sac (5) is pressurized, the actuator (1) is straightened. By increasing the pressure of the first sac (5), the rigidity o the actuator (1) in the straight state can be increased.

By pressurizing both two sacs at the same time, it can be provided that the actuator (1) is twisted at a limited level compared to what is provided with the pressurizing of only the second sac (6).

The first layer (2), the second layer (3), and the third layer (4) are knitted fabrics whose courses (7) extend perpendicular to the direction and the wales (8) parallel to the direction. Thereby, their flexibility under the effect of the forces parallel to the direction can be controlled with the knitting parameters.

The first layer (2), the second layer (3) and the third layer (4) are knitted as integrated with each other by using the three-dimensional whole-garment knitting technique. Providing the continuity of the connection between layers ensured that the resistance of the actuator (1) to be increased and the forces on the actuator (1) to be distributed evenly. In addition, thanks to the production being carried out in a computer assisted manner entirely, it is provided that the actuators (1) can be easily adapted to different use areas and measurements and produced with standard qualities even though different knitting parameters are used. The labor requirement can be considerably decreased and the formation of fabric scraps can be entirely eliminated.

The second layer (3) of the actuator (1) produced with the three-dimensional whole-garment knitting technique comprises more courses (7) per unit length compared to the first layer (2) and the third layer (4). In the second layer (3), yarns that comprised more flexible materials such as lycra can be used as well.

Preferably on the second layer (3), there are gathers (9) which makes twisting easier and increase the twisting amount. These gathers (9) are formed by knitting the second layer (3) in the way that the course (7)—wale (8) ratio on the inner parts will be greater compared to the one on the sides. By this means, the second layer (3) can be attached to the first layer (2) and the second layer (4) properly, without requiring stitches. The gathers (9) contribute to the determination of the twisting direction by providing an anisotropic flexion possibility to the second layer (3).

The actuator (1) as the subject of the invention can comprise at least one sensor (10). The sensors (10) could be positioned on one or more than one of the layers. Preferably, the sensors (10) are created by being integratedly knitted with the related layer during the knitting of the actuator (1). The sensors (10) are sensors (10) that are formed by using conductive yarns and whose electrical features such as impedance vary with the pressure affecting the same or shape variations thereof. The sensor (10) impedance can be dependent on resistance, capacitance, inductance or a combination thereof. In order to monitor the capacitance, two conductive layers on the related layer, and a dielectric layer located between them can be formed, or a conductive layer can be formed on each of the two surfaces of the layer so that the related layer will serve as a dielectric later. In order to monitor the inductance, various shapes can be formed on the related layer from conductive yarns.

The status and operational conditions of the actuator (1) can be monitored with sensors (10). Feedback related to the activity of the actuator (1) can be obtained by means of the sensors (10), and the forces affecting the actuator (1) can be monitored, and the control of the actuators (1) used within the supporting devices can be provided.

The actuators (1) according to the invention are basically produced with the steps of producing the first layer (2), the second layer (3), and the third layer (4) as a whole simultaneously with the three-dimensional whole-garment knitting technique, placing a first sac (5) and a second sac (6) between the layers and connecting pressurizing elements to the sacs. The first layer (2), the second layer (3) and the third layer (4) are produced seamlessly and in one piece by using the knitting parameters suitable for providing the desired measurements and flexibility. The second layer (3) is knitted in the way to comprise more courses (7) per unit length compared to the first layer (2) and the third layer (4). In addition, by decreasing the number of courses (7) on the unit length towards the sides of the second layer (3) wherein it intersects with the first layer (2) and the third layer (4), it is provided that on the sides, the first layer (3) and the third layer (4) have equal course (7) numbers on the unit length. By this means, the integrated layers can be produced such that the flexibility of the second layer (3) is more than the flexibility of the first layer (2) and the third layer (4).

Figure 9:
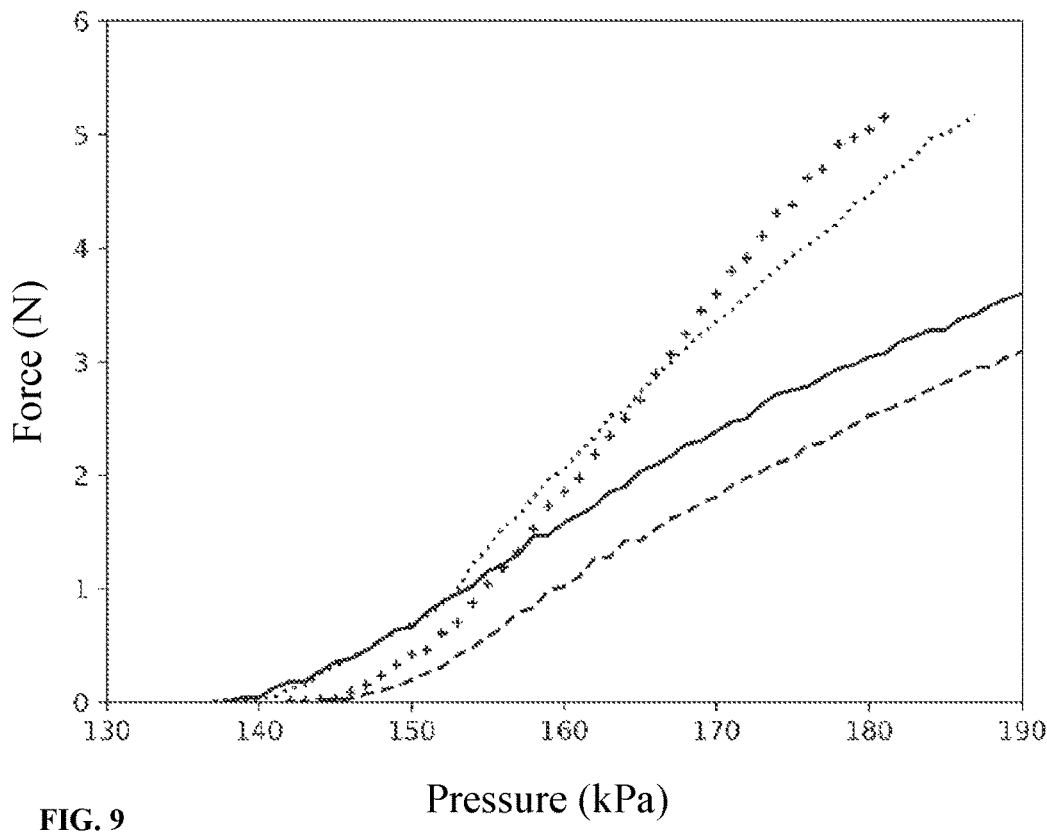
FIG. 9 is a pressure graphic of the actuators according to the invention relative to the end force.
Figure 10:
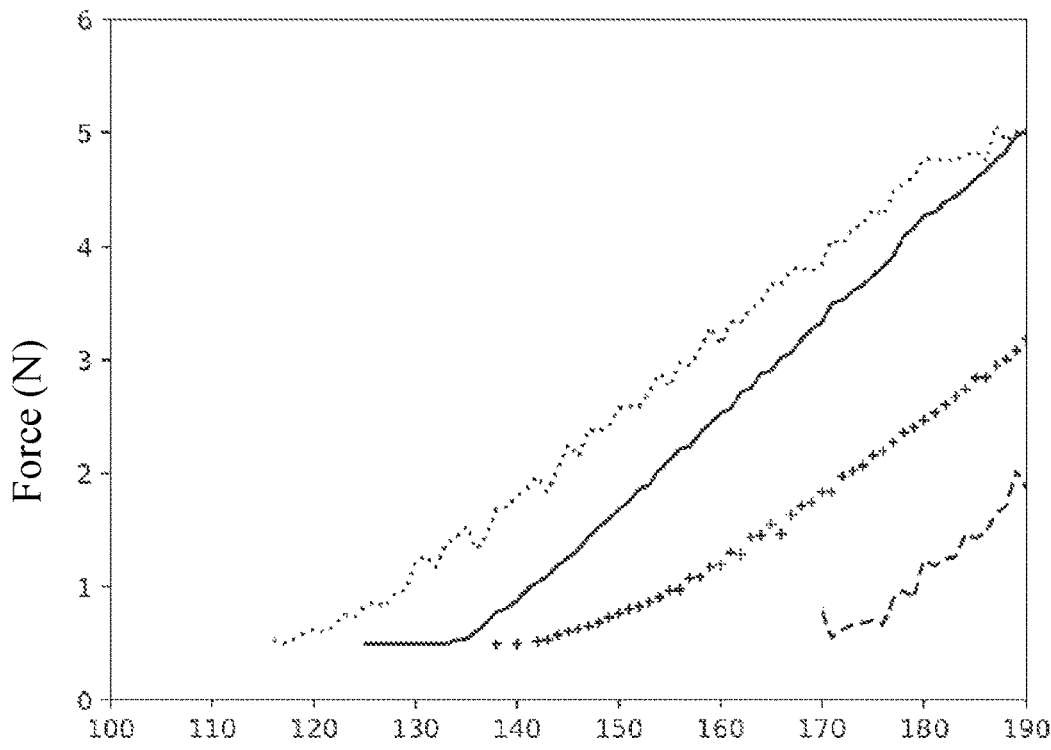
FIG. 10 is a pressure graphic of the actuators according to the invention relative to the retention force.
Figure 11:
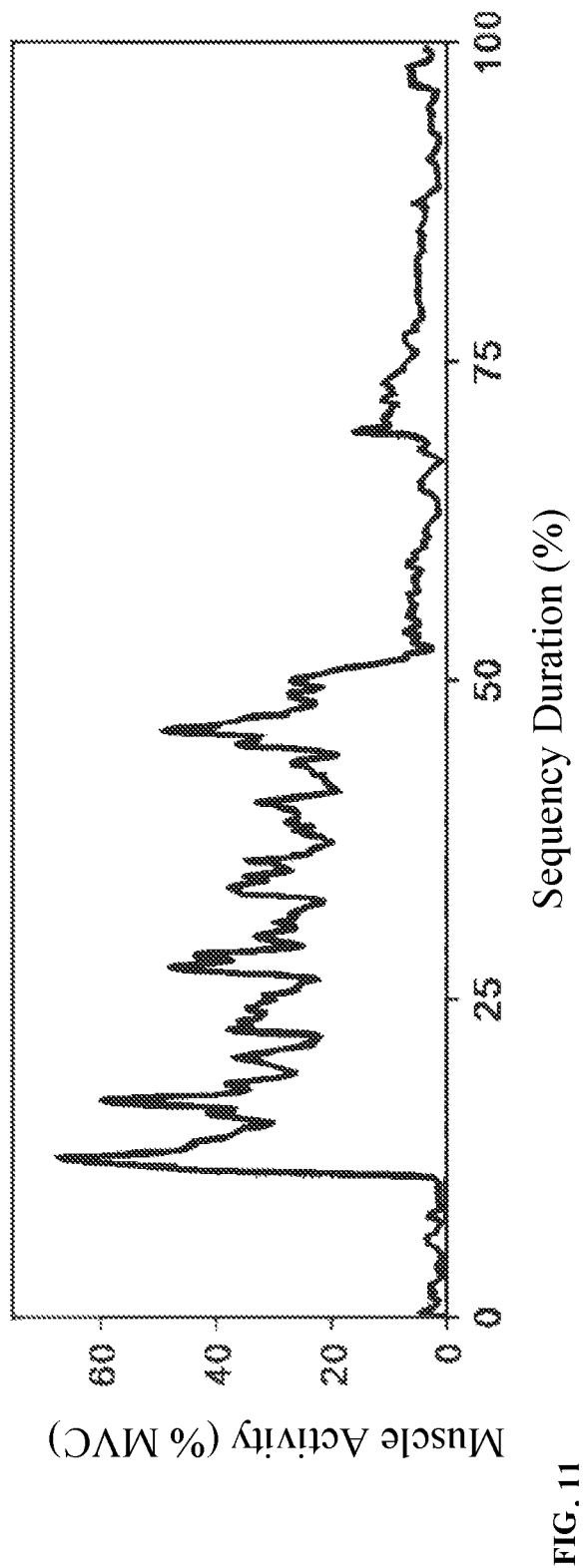
FIG. 11 is an electromyogram showing the flexor muscle activity measured without the glove.
Figure 12:
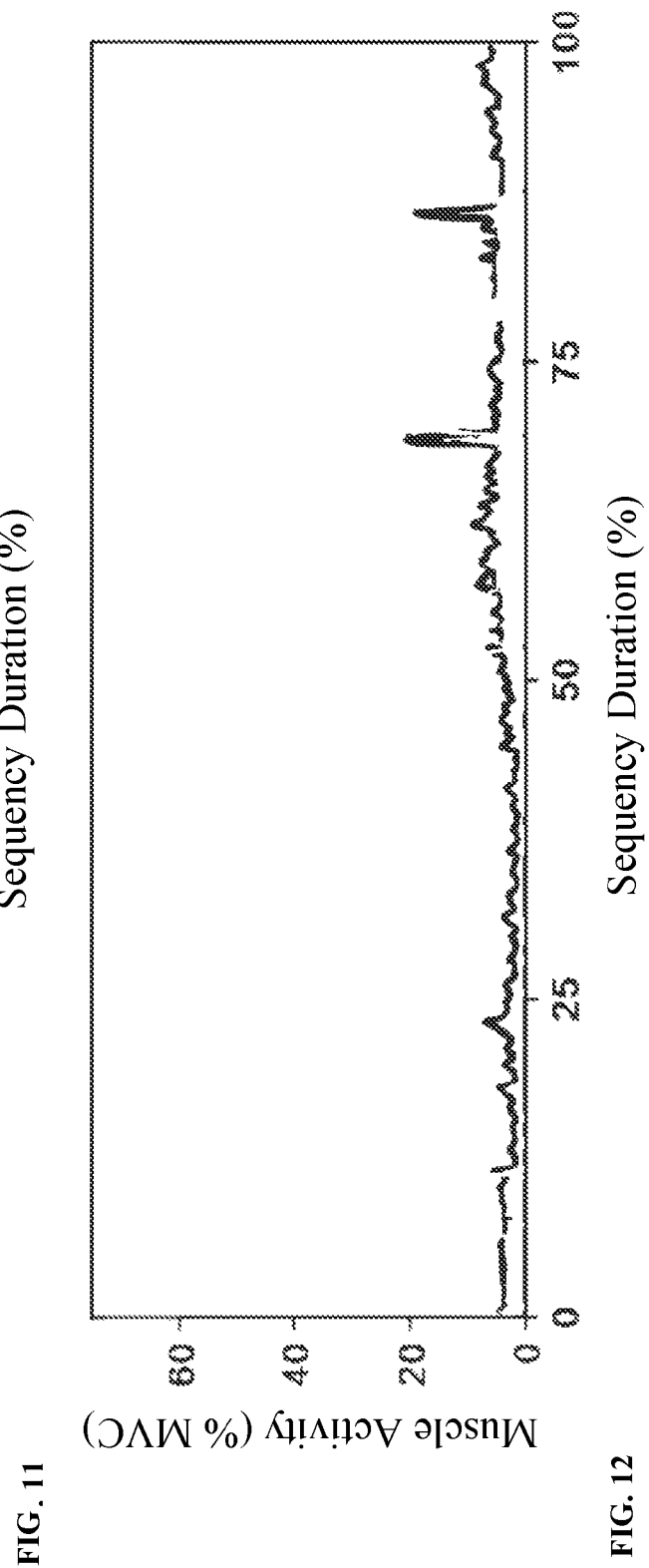
FIG. 12 is an electromyogram showing the flexor muscle activity measured with the glove seen in FIG. 10.
Figure 13:
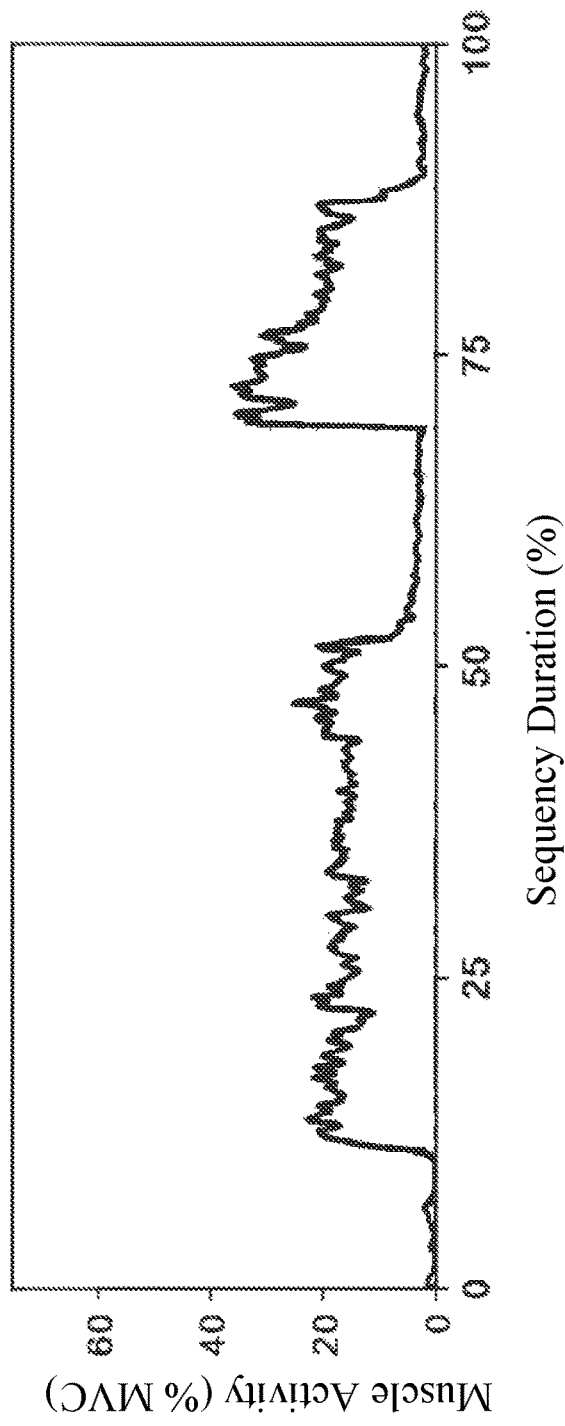
FIG. 13 is an electromyogram showing the extensor muscle activity measured without the glove.
Figure 14:
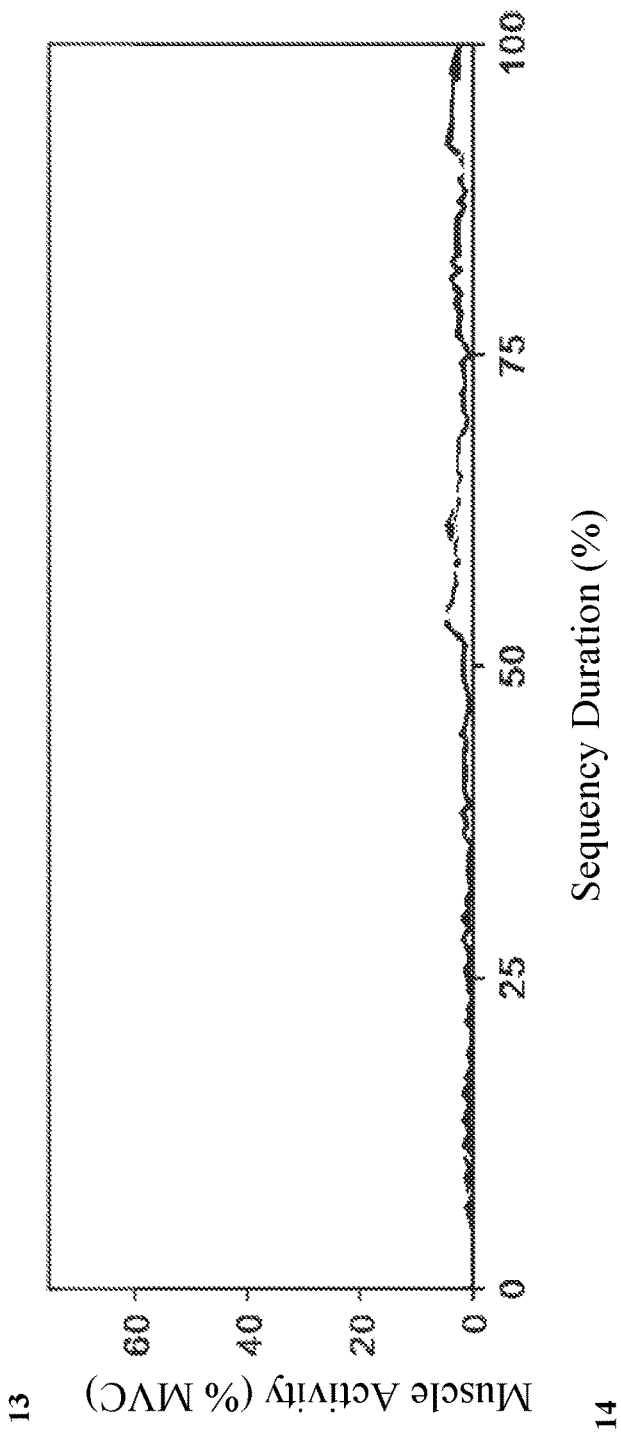
FIG. 14 is an electromyogram showing the extensor muscle activity measured with the glove seen in FIG. 10.

The results of the measurements realized with four different actuators (1) produced by using different yarns according to the invention are shown in FIGS. 9 and 10. In FIG. 9, the forces applied by the end points of the actuators (1) with the first sac (5) is in a pressurized state, in FIG. 10, the retention forces of the actuators (1) with the second sac (6) in a pressurized state, i.e., the forces applied by their concave surfaces in their twisted state are shown as dependent on the related sac pressures.

The actuators (1) as the subject of the invention (1) can be used in automation application wherein delicate and irregularly shaped parts are used, in rehabilitation equipment, and orthoses.

An example use of the invention is shown in FIG. 8. The hand movements of a user can be supported with a glove (11) with an actuator (1) according to the invention connected on each finger. This glove can be used for rehabilitation purposes by operating the pressurizing elements according to a certain program. Instead, the pressurizing elements can be operated by monitoring the movements of the user by means of the sensors (10), in the way to support these movements. In order to evaluate the activity of this application in which the user movements are supported, the electrical activity of the flexor and extensor muscles have been monitored during the closing and opening of the hand with the glove (11) and without the glove (11). The related electromyograms are shown in FIGS. 11 to 14. In the light of these results, the glove (11) comprising actuators (1) can significantly support the hand movements.

What is claimed is:

1. An actuator component production method comprising:
   knitting a first layer, a second layer, and a third layer between the first layer and the second layer, and
   placing a first sac and a second sac between the first layer, the second layer and the third layer, and
   wherein the first sac and the second sac are configured such that pressures of the first sac and the second sac are regulatable,
   wherein the first layer, the second layer and the third layer are produced as a whole with a three-dimensional whole-garment knitting technique,
   wherein the second layer is knitted in a way to comprise more courses on a unit length compared to the first layer and the third layer,
   wherein a number of courses on the unit length towards sides of the second layer intersecting with the first layer and the third layer is decreased so that the second layer has equal course numbers on the unit length with the first layer and the third layer.

* * * * *